UNITED STATES PATENT OFFICE.

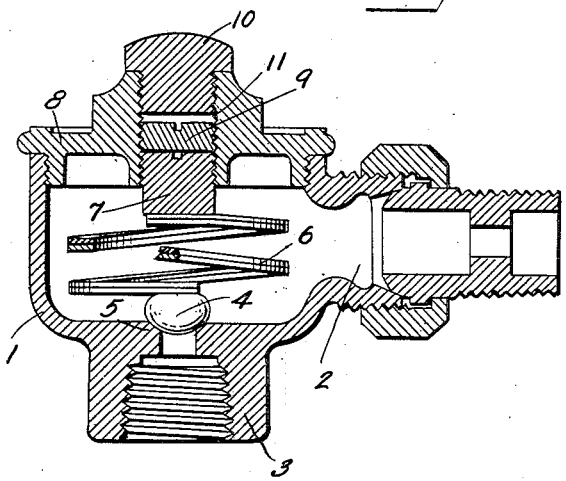
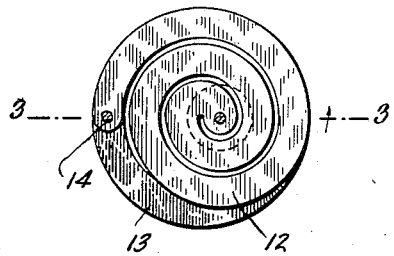
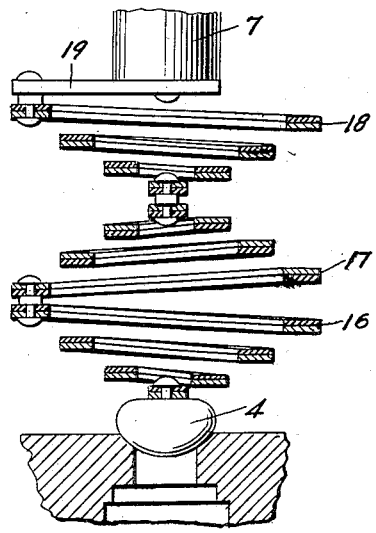
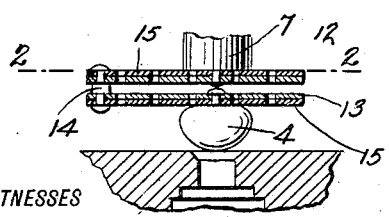

REUBEN N. TRANE, OF LA CROSSE, WISCONSIN.

THERMOSTATIC TRAP.

1,288,296.　　　　　Specification of Letters Patent.　　Patented Dec. 17, 1918.

Application filed November 23, 1917.　Serial No. 203,598.

*To all whom it may concern:*

Be it known that I, REUBEN N. TRANE, a citizen of the United States, and a resident of La Crosse, in the county of La Crosse and State of Wisconsin, have invented a new and Improved Thermostatic Trap, of which the following is a full, clear, and exact description.

This invention relates to thermostatic traps and has for an object the provision of an improved construction whereby a thermostatic member is used for giving back and forth movement to a valve member in order to open and close the same under varying conditions.

Another object of the invention is to provide a trap with a valve member operated by a thermo member held in place by an adjustable support.

A still further object of the invention is to provide a thermostatic member which in a small space will give a long thrust by reason of the spiral shape thereof.

In the accompanying drawing:

Figure 1 is a longitudinal vertical section through a trap disclosing an embodiment of the invention.

Fig. 2 is a sectional view through Fig. 3 on line 2—2, same showing a slight modified structure of the invention.

Fig. 3 is a transverse sectional view through Fig. 2 on line 3—3.

Fig. 4 is a sectional view similar to Fig. 3, but showing a super-imposed member in an expanded position.

In the construction of thermostatic valves heretofore a casing has been provided and means including a valve member for preventing the escape of steam while allowing the return of air and water. Various thermostatic members have been used for this purpose including a float, a double diaphragm containing a volatile liquid. In some instances straight thermostatic bars have been used, but when used require a large casing or body to the trap in order to secure the desired movement of the valve member. In the present invention it is aimed to produce a casing or body comparatively small, and yet provide a comparatively large movement to the valve member used in closing the trap when steam attempts to escape.

Referring to the accompanying drawing by numerals, 1 indicates the body or casing which is provided having an inlet extension 2 and an outlet extension 3 connected up to the heating system in any desired manner. The outlet 3 is designed to be closed by a valve member 4 engaging its seat 5. Valve member 4 is rigidly connected to the thermostatic member 6 in any suitable manner, as for instance by screw or rivet, and the thermostatic member 6 is in turn rigidly secured by any desired means to the adjustable screw 7 mounted on the cap 8. A locknut 9 is arranged on the cap 8 for locking the screw 7 in any desired position, while above the nut 9 is arranged a capnut 10 for closing the threaded opening 11 in the cap 8 and also for producing a neat appearance. This capnut also insures a perfectly tight trap as it may be screwed down tight against the cap 8 which in turn is screwed into the body 1. The thermostatic member 6 is made into a permanent spiral with two dissimilar metals of any desired kind. These two metals have of course different expanding qualities and are connected together in any suitable manner as for instance by welding, soldering, riveting or the like, so that they will act together. By coiling the strips of metal forming the member 6 a comparatively long structure can be used in a small body or casing 1 and thereby provide for a comparatively long up and down movement of the valve member 4. By making the coil longer or shorter additional movement or less movement may be secured according to the various requirements involved.

In Figs. 2 and 3 will be seen a modified form of the invention in which the metal strips forming the thermostatic members 12 and 13 are applied and arranged in a spiral. The center of the lower thermostatic member 13 is connected with the valve 4 and the upper end thereof is connected at 14 by a suitable rivet to the upper thermostatic member 12 which has its center on the opposite end connected with the adjustable screw 7. If the two thermostatic members 12 and 13 in this form of the invention do not produce the desired movement one or more thermostatic members could be added. It will be observed that the particular strip of metal 15 on the thermostatic member 13 is on the lower side, while the same strip 15 is on the upper side of member 12 in order to give a continuous motion to the valve 4. If a third thermostatic member was added the member 15 would be on the lower side and so on for as many members as used. This will cause all of the thermostatic members to act together for moving the valve downwardly or upwardly.

In Fig. 4 will be seen three thermostatic members 16, 17 and 18 said thermostatic members being constructed similar to that shown in Fig. 3, but shown in a full expanded position, whereby the valve 4 is pressed tightly against its valve seat. When the thermostatic members become cool they will move back to their former position so that all of the coils of the member 18 will be in the same plane, and likewise the coils of member 17 and 18 will be in their respective plane similar to the arrangement in Fig. 3, but disclosing three super-imposed thermo members. In this form of the invention an arm 19 is connected to the screw 7 in order that the outer end of the thermostatic member 18 may be properly supported by the screw 7 in the center of the thermostatic member arranged in line with the center of the screw as well as the center of the valve member 4.

In operation when any of the forms of the invention are arranged in the body of the casing, as shown in Fig. 1, the thermostatic member will be contracted so that the valve member 4 will be off its seat. As the air and water pass out the thermostatic member and valve will remain in their original position, but as soon as the steam attempts to pass out the thermostatic member will become heated and by reason of the different expansive quality of the metal valve member 4 will be moved against its seat. As soon as water has accumulated in the valve, or air has accumulated therein the same will cool member 6 and consequently cause the same to contract and open valve member 4 which will again remain open until heated by the steam attempting to pass out of the trap. In this manner the air and water from the radiator or other heating element is permitted to flow therethrough while the steam is prevented from flowing therethrough.

What I claim is:

1. A thermostatic member for valves comprising a plurality of sets of spiral members, each spiral member being formed of two strips of metal having different expansive qualities, the position of the respective metals being reversed on each successive spiral, means for connecting the outer ends of adjacent spirals together, and means for connecting the inner ends of adjacent spirals together whereby the ends of the complete series will be moved toward and from each other according to the direction of expansion of the metals.

2. A thermostatic member comprising a spiral structure formed of a plurality of strips of metal connected together, said strips having different expansive characteristics, said strips being connected together flatwise, the plane of the flat surface positioned at right angles to the axis of the spiral.

3. A thermostatic member comprising a flat disk formed from a spiral of a flat strip of material with the flat face of the strip parallel with the flat face of the disk, said strip being formed of a plurality of dissimilar metals whereby when under a change of temperature one metal will expand more than the other for causing the strips to have a tendency to move substantially perpendicular to the normal position of the disk.

4. A thermostatic member comprising a flat disk with a spiral slot arranged therein extending from near the center to the periphery, said disk being made from a plurality of dissimilar metals whereby when under a change of temperature one metal will expand more than the other.

REUBEN N. TRANE.